C. F. RENARD.
RESILIENT HUB FOR VEHICLE WHEELS.
APPLICATION FILED JULY 9, 1917.

1,334,402.

Patented Mar. 23, 1920.
2 SHEETS—SHEET 1.

Inventor:
Charles François Renard
per H. W. Plucker
Attorney.

C. F. RENARD.
RESILIENT HUB FOR VEHICLE WHEELS.
APPLICATION FILED JULY 9, 1917.

1,334,402.

Patented Mar. 23, 1920.

Inventor:
Charles François Renard
per H. W. Plucker
Attorney.

UNITED STATES PATENT OFFICE.

CHARLES FRANÇOIS RENARD, OF CORMEILLES-EN-PARISIS, FRANCE.

RESILIENT HUB FOR VEHICLE-WHEELS.

1,334,402.	Specification of Letters Patent.	Patented Mar. 23, 1920.

Application filed July 9, 1917. Serial No. 179,403.

*To all whom it may concern:*

Be it known that I, CHARLES FRANÇOIS RENARD, of Cormeilles-en-Parisis, Seine-et-Oise, in the Republic of France, have invented a Resilient Hub for Vehicle-Wheels, of which the following is a full, clear, and exact description.

This invention relates to resilient wheels and is particularly applicable to the wheels of motor vehicles. It has for its general object to provide an improved wheel structure of the kind in which the stresses are taken up by circumferential springs interposed between the hub and felly. Specifically it is an object of the invention to provide means whereby the springs and the movable parts on which they act are effectively guided during the rotation of the wheel.

To this end the wheel embodying my invention comprises two parts, which may be referred to broadly as a hub and a felly, either one of which is provided with a circular guideway in which sliding members rigidly connected with the other parts are yieldingly mounted. These sliding members extend through openings in two substantially parallel rings mounted to rotate in the guideway. The openings in each ring overlap those in the other ring and springs are arranged in the open space common to each pair of overlapping openings to normally maintain the sliding members in engagement with opposite end walls of the overlapping openings. These walls are preferably so shaped as to guide the sliding members when, after the application of a stress, they automatically return to their normal positions under the action of the springs.

In the accompanying drawings which illustrate by way of example an embodiment of the invention in which the circular guideway is provided on the hub of the wheel:

Figure 1:
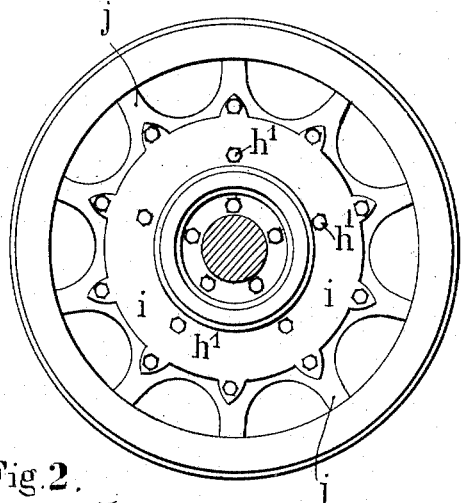
Figure 1 is an elevation of the complete wheel.

In the embodiment shown in the drawing the hub comprises two substantially parallel circular plates provided with central openings for the reception of the axle of the wheel and shaped so as to form, when assembled together, a circular guideway as hereinafter explained.

These plates comprise each a vertical inner or central portion designated by $c$ and $c'$ respectively, a circular rib arranged to abut against a corresponding rib on the other plate to form therewith a rim $a$ (Fig. 3), and an outer portion comprising a plurality of radial arms $d$, provided with inwardly extending projections $b$. The plates are held together by suitable means (not shown) and braced by a circular rib $c^2$ on the part $c'$ engaging in a corresponding groove $c^3$ in the part $c$.

Figure 3:
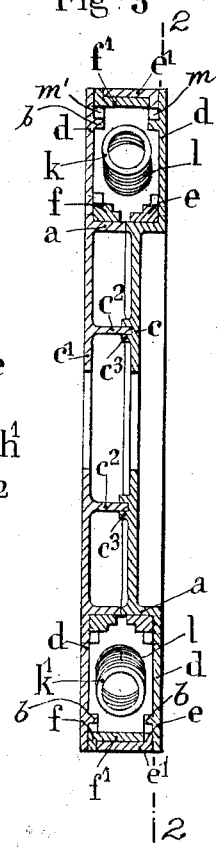
Fig. 3 is a diametrical section of the hub taken on line 3—3 of Fig. 2.

Within the annular space between the rim $a$ and the arms $d$ are arranged two vertical rings $e$ and $f$ which are free to rotate independently through a limited angle and are held apart from one another and against the straight portions of the arms $d$ by flanges $e'$ and $f'$ (Fig. 3). Each of these rings is provided with openings designated by $e^2$ and $f^2$ respectively, in which are engaged the projections $b$ on the arms $d$.

Figure 4:
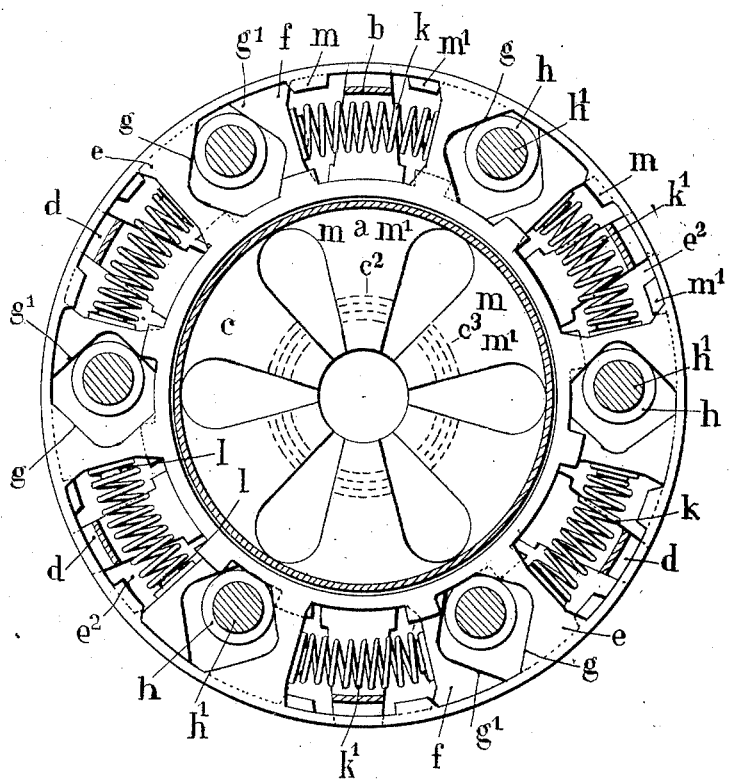
Fig. 4 is a view similar to Fig. 2 showing the hub in use.
Figure 5:
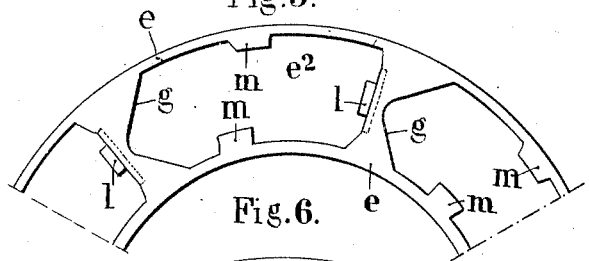
Figs. 5 and 6 are partial elevations of the rotating rings.

As shown in Fig. 5 the openings $e^2$ are provided at one of their ends with a notch having inclined walls $g$ which define an angle substantially 90°, while at their other ends these openings are provided with a projection or lug $l$ for the purpose of supporting springs $k$ and $k'$ to be described hereafter. The openings $e^2$ are also provided on their side or circumferential edges with projections $m$ adapted to be engaged by the projections $b$ on the arms $d$ to limit the relative movements of the ring $e$ and hub, as shown in Figs. 2 and 4.

Figure 6:
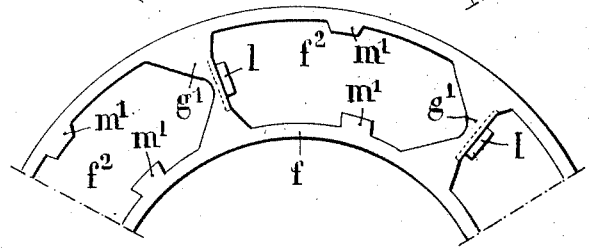

The openings $f^2$ in ring $f$ (Fig. 6) have a shape similar to that of the openings $e^2$, being provided with walls $g'$ defining right-angle notches, lugs $l'$ and projections $m'$ identical with the lugs $l$ and projections $m$ respectively, but they are arranged in the opposite direction so that the notches of the two sets of openings $e^2$ and $f^2$ will face each other.

Figure 2:
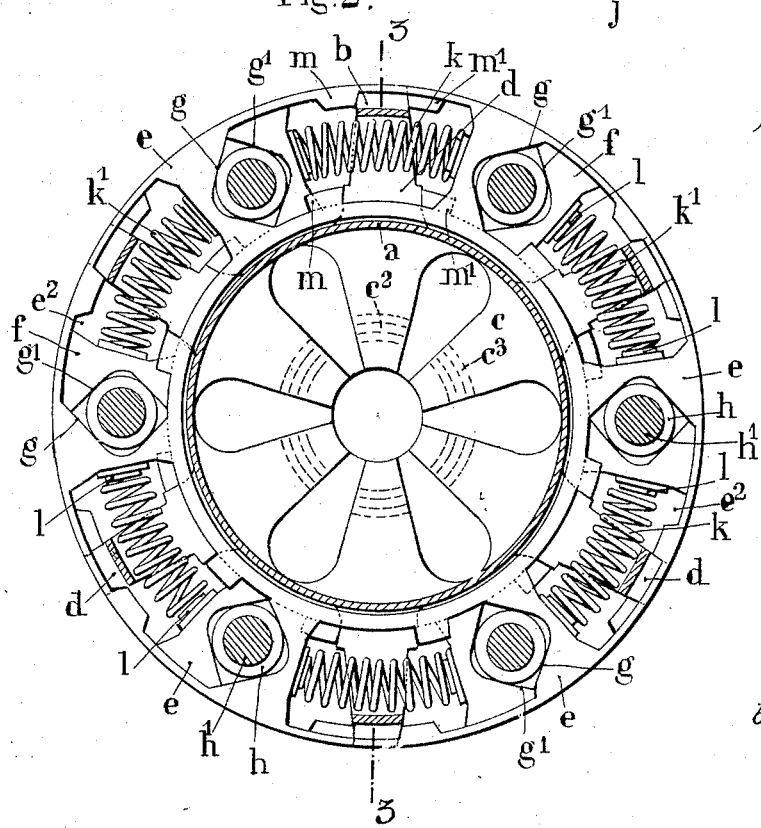
Fig. 2 is a circumferential section of the hub on line 2—2 of Fig. 3.

In the assembled hub, the openings $e^2$ and $f^2$ overlap each other (Fig. 2). Between each pair of walls $g$ and $g'$ are arranged rollers $h$ which extend transversely of the hub and are mounted to rotate on pivots $h'$ secured to and carried by two plates $i, i$, which are secured to the spokes $j$ of the wheel (Fig. 1). As shown in Fig. 2 the rollers $h$ are normally held in engagement with the walls $g$ and $g'$ by means of springs $k$ and $k'$ interposed between the lugs $l$ and $l'$ in the respective pairs of openings $e^2$ and $f^2$.

The operation is as follows:

As long as the vehicle is at rest the rollers $h$ remain within the notches in the openings $e^2$ and $f^2$, being clamped between the walls $g$ and $g'$ under the action of the springs $k$ and $k'$ (Fig. 2).

When the vehicle is started the hub begins to rotate, but, as the wheel is at first prevented from moving by the resistance due to its contact with the ground, the pivots $h$ will not begin to rotate until the springs $k$ and $k'$ have been compressed to a certain extent, the movement of the felly then taking place gradually.

When the wheel meets an obstacle, all the pivots $h'$ are displaced vertically (Fig. 4) and all the walls $g$ will be rotated simultaneously through the same angle since they are carried by the ring $e$; likewise all the walls $g'$ will be rotated simultaneously, so that all the springs $k$ and $k'$ will be equally compressed, and any shock will be transmitted simultaneously to all the springs and effectively deadened.

It will be understood that various changes may be made in the structure described without departing from the scope of the invention. Thus, while the parts $d$, $a$ and $c$ or $c'$ are shown to be integral with one another, they may comprise separate elements rigidly secured together in any suitable manner. Further, it is obvious that the annular channel might be provided on the felly or on a part rigidly connected with the felly, instead of on the hub, in which case the sliding members or rollers $h$ would be carried by the hub.

I claim:

1. A resilient wheel comprising two relatively movable concentric parts, one of said parts having a circular guideway, two rings rotatably mounted in said guideway, said rings having openings overlapping one another, the other of said parts having sliding members extending through said openings, and springs in said channel adapted to yieldingly clamp said sliding members between opposite ends of the overlapping openings.

2. A resilient wheel comprising a felly and a hub, said hub having a peripheral guideway, two substantially parallel rings rotatably mounted in said guideway, said rings having openings overlapping one another, sliding members carried by said felly and extending through said openings, and springs in said channel adapted to yieldingly clamp said sliding members between opposite ends of the overlapping openings.

3. A resilient wheel comprising a felly and a hub, said hub having a peripheral guideway, two substantially parallel rings rotatably mounted and guided within said guideway, said rings having elongated openings overlapping one another, sliding members carried by the felly and extending between opposite end walls of the overlapping openings, and springs interposed between the end walls of said openings remote from the sliding members, said springs tending to hold the sliding members in engagement with the end walls adjacent thereto.

4. A resilient wheel comprising a felly and a hub, said hub having a peripheral guideway, two parallel rings capable of independent rotation within said guideway, said rings having elongated openings overlapping one another, said openings having notches at one end thereof, the notches in one ring facing the notches in the other ring, rollers carried by the felly and extending between the notches in overlapping openings, and springs interposed between the end walls of said openings remote from said notches, said springs tending to hold the rollers centrally positioned in said notches.

5. A resilient wheel comprising a felly and a hollow hub, said hub consisting of two substantially vertical plates having abutting ribs, the outer portions of said plates forming a circular guideway, two parallel rings rotatably mounted in said guideway, said rings having elongated openings overlapping one another, said openings having notches at one end thereof and spring supporting lugs at their other end, the notches in one ring facing the notches in the other ring, rollers carried by the felly and extending between the notches in overlapping openings, springs interposed between opposite supporting lugs, said springs tending to hold the rollers centrally positioned in said notches, and means on said plates for limiting the rotation of said rings.

The foregoing specification of my resilient hub for vehicle wheels, signed by me this 12th day of June 1917.

CHARLES FRANÇOIS RENARD.

Witnesses:
 CHAS. P. PRESSLY,
 FRANÇOIS WEBER.